United States Patent [19]
Ophey

[11] Patent Number: 6,072,632
[45] Date of Patent: Jun. 6, 2000

[54] IMAGE DISPLAY DEVICE AND HEAD-MOUNTED DISPLAY COMPRISING SUCH A DEVICE

[75] Inventor: Willem G. Ophey, Eindhoven, Netherlands

[73] Assignee: U.S. Philips Corporation, New York, N.Y.

[21] Appl. No.: 09/210,414

[22] Filed: Dec. 11, 1998

[30] Foreign Application Priority Data

Dec. 11, 1997 [EP] European Pat. Off. ............... 97203893

[51] Int. Cl.[7] .................................................... G02B 27/14

[52] U.S. Cl. ............................................ 359/633; 359/630

[58] Field of Search ..................................... 359/630, 631, 359/633, 637, 634; 345/7, 8

[56] References Cited

U.S. PATENT DOCUMENTS

| | | | |
|---|---|---|---|
| 3,443,858 | 5/1969 | LaRussa | 359/631 |
| 5,654,828 | 8/1997 | Togino et al. | 359/633 |
| 5,659,430 | 8/1997 | Togino | 359/731 |
| 5,801,885 | 9/1998 | Togino | 359/630 |

*Primary Examiner*—Ricky Mack
*Attorney, Agent, or Firm*—Peter Verdonk

[57] ABSTRACT

The present invention relates to an image display device (1) comprising a two-dimensional display (3; 19, 21; 72) and an optical system (5; 15, 17; 60). The optical system comprises a lens having a first semitransparent reflecting surface (23, 25; 9) and a second semitransparent reflecting surface (27, 29; 11). The first surface is directed towards the display. The second surface is directed towards the viewer. Both the display and the lens are divided into a plurality of segments in order to increase the field of view.

19 Claims, 8 Drawing Sheets

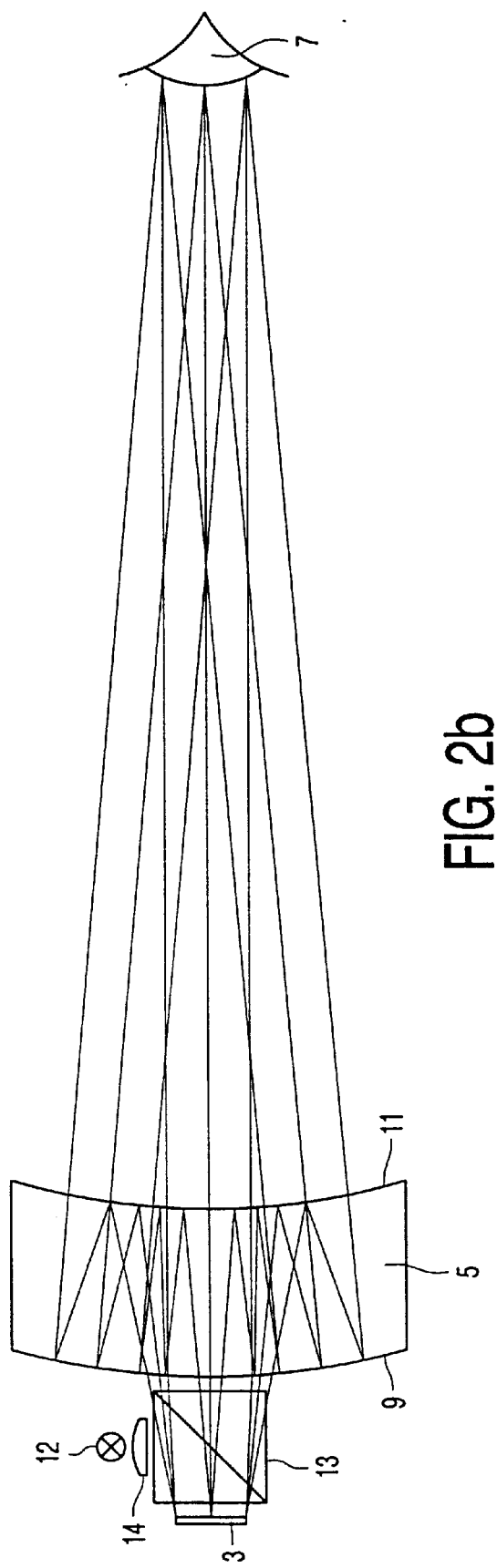

IMAGE DISPLAY DEVICE AND HEAD-MOUNTED DISPLAY COMPRISING SUCH A DEVICE

BACKGROUND OF THE INVENTION

The invention relates to an image display device comprising at least one two-dimensional display element and an optical system, which optical system comprises a lens system having a first semitransparent reflecting surface which is directed towards the display element and a second semitransparent reflecting surface which is remote from the display element.

The invention also relates to a head-mounted display comprising such an image display device.

An image display device of the type described in the opening paragraph is known from, for example United States patent U.S. Pat. No. 5,659,430. The image display device described in this patent comprises a two-dimensional display element and an optical system via which the image generated by the display element is imaged in the eye of a viewer. The optical system comprises a buried mirror lens. Such a lens has a first and a second semitransparent reflecting surface on which incident light rays are passed at least once and reflected at least once. In this way, it is achieved that the light path between the display element and the viewer's eye can be considerably shortened by repeated reflections.

An image display device as described above is very suitable for use in head-mounted displays. Compactness and weight are of great importance in head-mounted displays. Important factors are the weight and the volume of the optical system. Moreover, it is desirable that a large field of view can be realized in head-mounted displays, notably for virtual reality applications.

A drawback of the image display device described is that the display element must be relatively large if an optimal maximum resolution is to be achieved, so that the cost price is relatively high. Another drawback is that, when the display element is a reflective display panel, coupling in light is impeded because the on-going and projected beams propagate along the same light path. A solution to this problem is the use of a splitting cube or a splitting mirror, but this is at the expense of the compactness of the system in relatively large display elements.

SUMMARY OF THE INVENTION

It is an object of the present invention to provide an image display device which is relatively compact and inexpensive and in which a relatively large field of view is realized.

To this end, the image display device according to the invention is characterized in that both the display element and the lens system are divided into a plurality of segments.

By dividing a display element with a field of view determined by the total field angle $\Omega_1 \times \Omega_2$ into a plurality of segments $\omega_1 \times \omega_2$, in which, for example $\Omega_1/\omega_1$ and $\Omega_2/\omega_2$ are 10°, it is sufficient to use lens segments having a field angle of 10°×10°. $W_1$ and $W_2$ are the number of segments in a first and a second direction. Such a division of the display element and the lens system results in a smaller total surface of display elements and allows relatively large fields of view within a compact design. A further advantage of segmentation of the lens system is that the field of view can be extended relatively easily. As the field of view to be realized with a lens segment becomes smaller, the total surface area of display elements also becomes smaller. The lens system is preferably directed with its convex side to the display element.

An embodiment of the image display device according to the invention is characterized in that the first surface is composed of spherical segments having a radius of curvature which is equal to the distance between the apex of the first surface and the exit pupil of the device, the segments having the same center of curvature.

A further embodiment of the image display device according to the invention is characterized in that the second surface is composed of spherical segments having a radius of curvature which is equal to the distance between the apex of the second surface and the exit pupil of the device, the segments having the same center of curvature.

The two above-mentioned measures ensure that the first and/or second surface can be manufactured as a whole, which considerably simplifies its manufacture.

A further embodiment of the image display device according to the invention is characterized in that the segments have a first reflecting surface which is aspherical.

A further embodiment of the image display device according to the invention is characterized in that the segments have a second reflecting surface which is aspherical.

This has the advantage that imaging errors such as curvature of the image field, astigmatism and coma can be prevented.

Each lens segment of the lens system may be made of, for example a single piece of optically transparent material, in which the first and the second surface form part of the same piece of material. The first surface is provided, for example on the convex side of the segments, whereas the second surface is present on the concave side of the lens.

Each lens segment may be alternatively made of, for example a first portion and a second portion of optically transparent material. The first surface is then present on the first portion, for example on its concave side and the second surface is present on the second portion, for example on its convex side. The two portions are separated from each other by, for example a layer of air.

A further embodiment of the image display device according to the invention is characterized in that the lens segments have a polygonal shape.

At a small total curvature of the lens system, each lens system may have, for example a square shape. At larger curvatures, i.e. when a larger field of view is desired, the lens segments may be, for example pentagonal or hexagonal.

Radiation beams of border pixels may give rise to disturbing light. The optical image may be optimized in different manners.

A first embodiment of the image display device according to the invention is characterized in that the interface between two lens segments is provided with an absorbing layer.

A second embodiment of the image display device according to the invention is characterized in that the semitransparent reflecting surface of the lens segments facing the display element comprises a central portion which is enclosed between two lateral portions, the central portion being provided with the semitransparent reflecting layer and the lateral portions comprising an absorbing layer.

A third embodiment of the image display device according to the invention is characterized in that the semitransparent reflecting surface of the lens segments facing the display element comprises a central portion which is enclosed between two lateral portions, the central portion being provided with the semitransparent reflecting layer and the lateral portions comprising a totally reflecting layer.

The second or third embodiment is preferred, because they can be realized in a relatively easy manner.

The passage of the radiation beams of border pixels towards the viewer is prevented in the manners described.

These and other aspects of the invention are apparent from and will be elucidated with reference to the embodiments described hereinafter.

BRIEF DESCRIPTION OF THE DRAWINGS

In the drawings:

FIG. 2(b) shows the radiation path between the display element and the eye of a viewer for one segment, in which also an illumination mode is illustrated;

DESCRIPTION OF THE PREFERRED EMBODIMENTS

Figure 1:
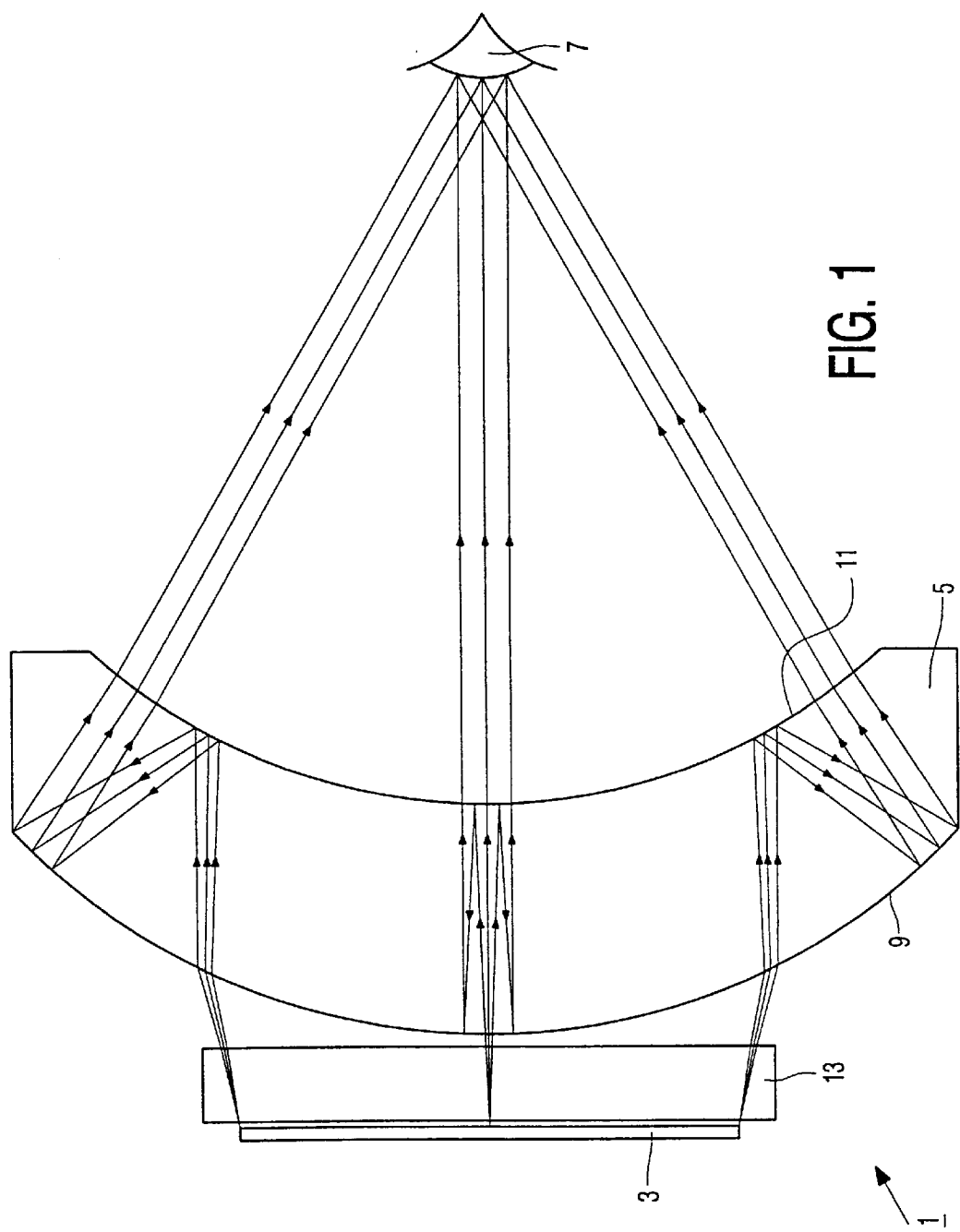
FIG. 1 shows the radiation path between the display element and the eye of a viewer, in an image display device comprising a non-segmented mirror lens.

The image display device 1 shown diagrammatically in FIG. 1 comprises a display element 3 and an optical system comprising a lens system in the form of a single mirror lens 5. The image generated in the display element 3 is projected via the optical system in the pupil of the eye 7 of a viewer. The mirror lens 5 has a first semitransparent reflecting surface 9 and a second semitransparent reflecting surface 11. Light rays are preferably passed at least once and reflected at least once by both the first and the second semitransparent reflecting surface. FIG. 1 illustrates the radiation path of three pixels. The first semitransparent reflecting surface 9 and the second semitransparent reflecting surface 11 are preferably adapted in such a way that a radiation beam passed by the first surface 9 towards the viewer is reflected by the second surface 11, and the radiation beam reflected by the second surface 11 is subsequently reflected by the first surface 9. The radiation beam will then be passed by the second surface 11 towards the eye 7. Preferably, the concave side of the mirror lens 5 is directed towards the viewer and the convex side is directed towards the display element. Since the light path is folded, a relatively large magnification can be realized by means of a mirror lens in a compact system. Such a configuration is known in literature as a Cassegrain system.

The image display panel 3 may be, for example a reflective or a transmissive liquid crystalline display panel comprising a matrix of pixels. When segmented, the display panel comprises a number of display elements. The display element may be an active or a passive element. A voltage in conformity with the image information to be displayed can then be applied to the pixels, for example, by means of electrodes. In this case, the illumination may be effected by means of, for example a radiation source or by means of the ambient light.

FIG. 2(b) shows an embodiment in which the illumination mode is shown for a single segment 5. The radiation beam from a radiation source 12, for example a set of LEDs, is collimated by a lens 14 and is incident on the element 13. This element 13 ensures that the light from the radiation source 12 is coupled into the system, in other words, the display element 3 is illuminated. This configuration is notably important when the display element 3 is a reflective display panel.

The display element may be alternatively a self-emitting element consisting of, for example a two-dimensional LED array.

The display element provides another possibility in that a two-dimensional image is generated by means of a LED or a semiconductor laser in combination with a two-dimensional scanning mechanism. The same result is achieved with, for example a linear LED array and a one-dimensional scanning mechanism.

All Figures show an optical element denoted by the reference numeral 13, which element ensures that light is coupled into the system. The element may be, for example a splitting cube or a splitting mirror. This element 13 is only required in those cases where the display element 3 is a reflective display panel so as to allow illumination of the display panel. This element 13 can thus be dispensed with in the other types of display elements such as, for example in transmissive display panels or display elements using the above-mentioned scanning methods.

Figure 2A:
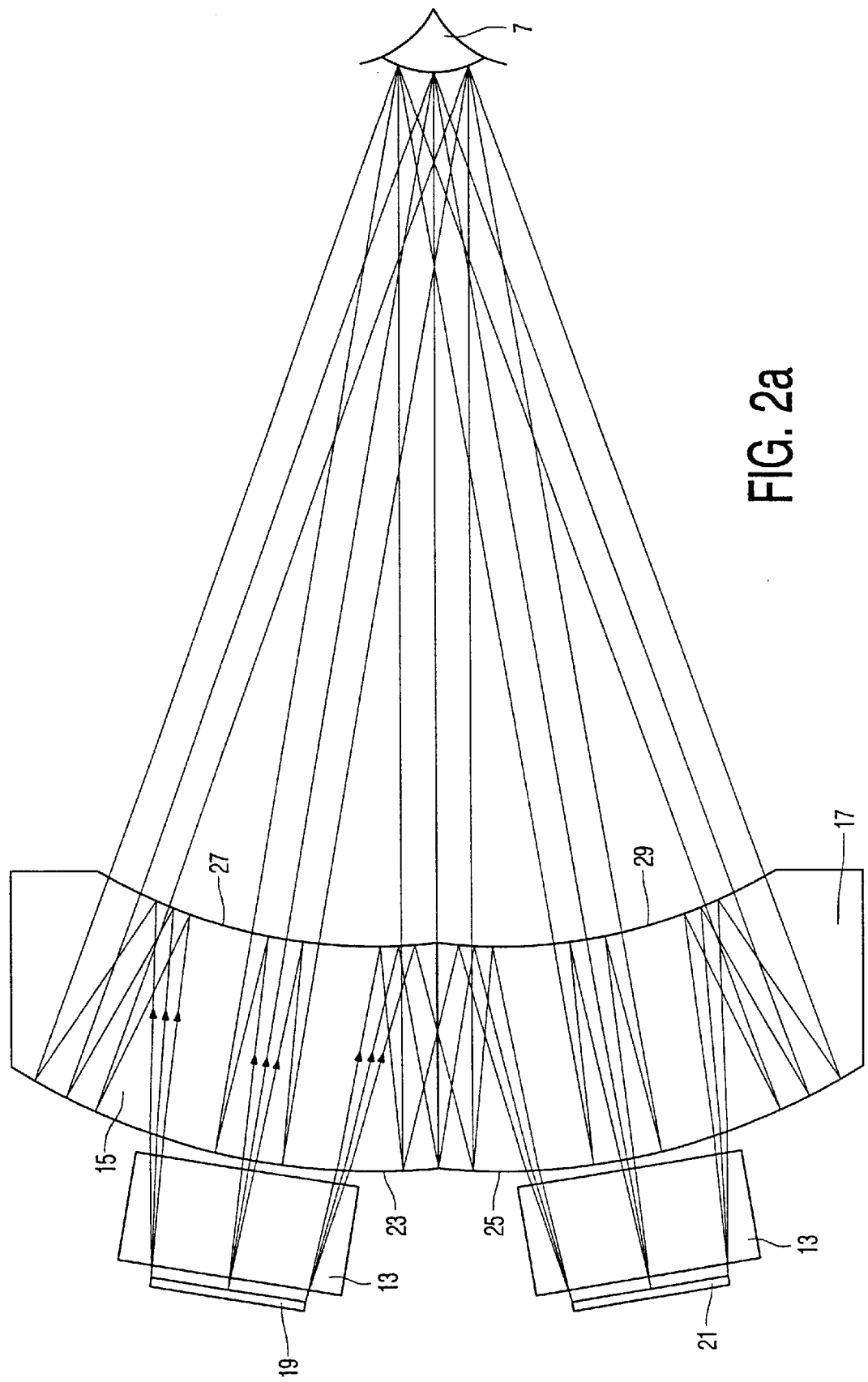
FIG. 2(a) shows the radiation path between the display element and the eye of a viewer in an image display device according to the invention, for a lens system having two lens segments.

The present invention proposes to segment the lens system 5 and the display element 3. An embodiment of a part of an image display device with a lens system comprising two lens segments 15, 17 and in conformity with two display elements 19, 21 is shown in FIG. 2(a). Each lens segment 15, 17 has a first semitransparent reflecting surface 23, 25 and a second semitransparent reflecting surface 27, 29, respectively. Reflection and transmission in the manner as described for the single mirror lens shown in FIG. 1 take place on each of the surfaces 23, 27 and 25, 29. The present invention is based on the recognition that a relatively large field of view can be realized by segmenting the mirror lens and the display element, using a compact and light-weight system.

Figure 3:
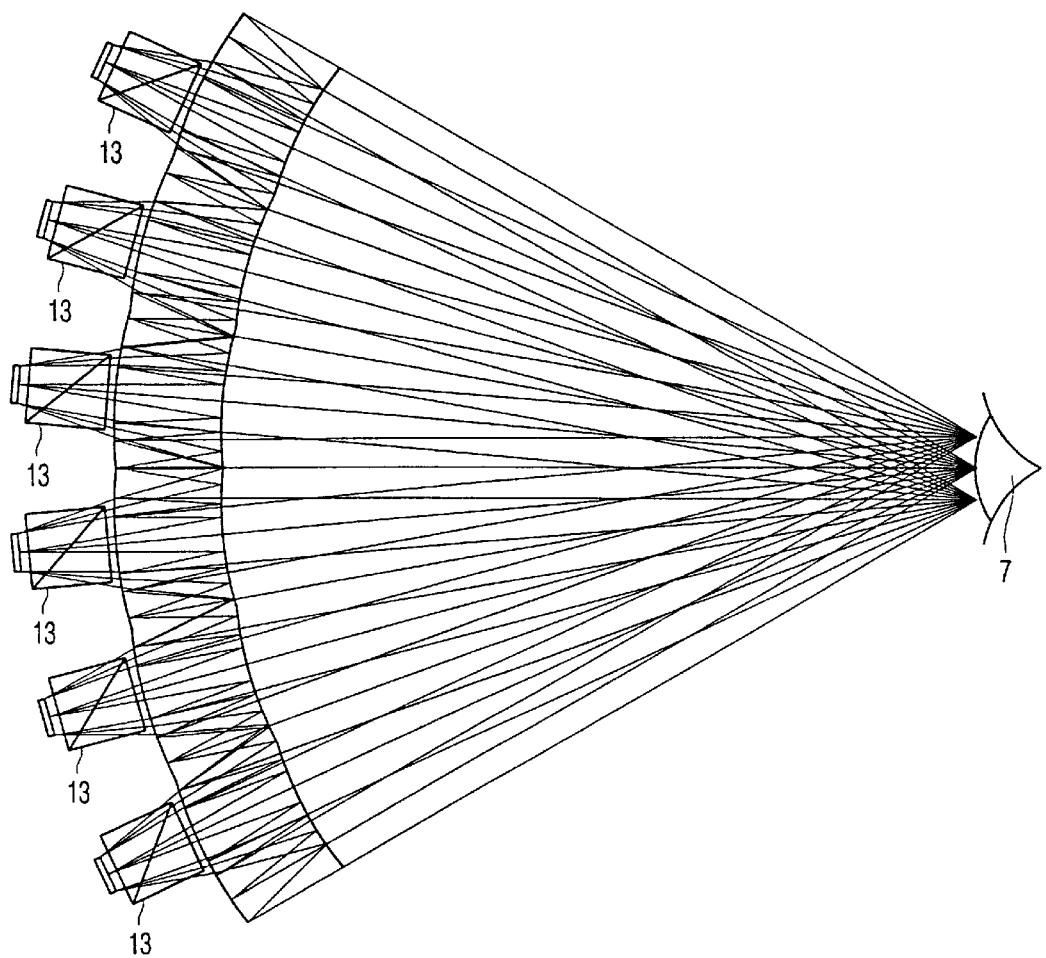
FIG. 3 shows an embodiment of an image display device according to the invention, with a lens system having 6×6 lens segments.

FIG. 3 is a side-elevational view of an embodiment of an image display device according to the invention, comprising 6×6 segmented lens elements. A radiation path as elucidated with reference to FIG. 1 for the complete mirror lens is applied for each lens segment. By increasing the number of lens segments, the field of view can be enlarged to a considerable extent, while the image display device yet remains compact and light-weight.

In this way, for example, a display panel in a system with a field of view extending through a total field angle of 60°×60° is divided into a plurality of segments, for example 6×6. Each lens segment then has a field angle of 10°×10°. The mechanical boundary of each segment is chosen to be such that the radiation beam of a pixel of a display element at the edge of the display element is partly vignetted so that the edge of a display element is visualized as minimally as possible and the images of two juxtaposed display elements optimally blend with each other. In fact, the image of the pixels at the edges of a display element will overlap with the images at the edges of the contiguous display elements.

Figure 4:
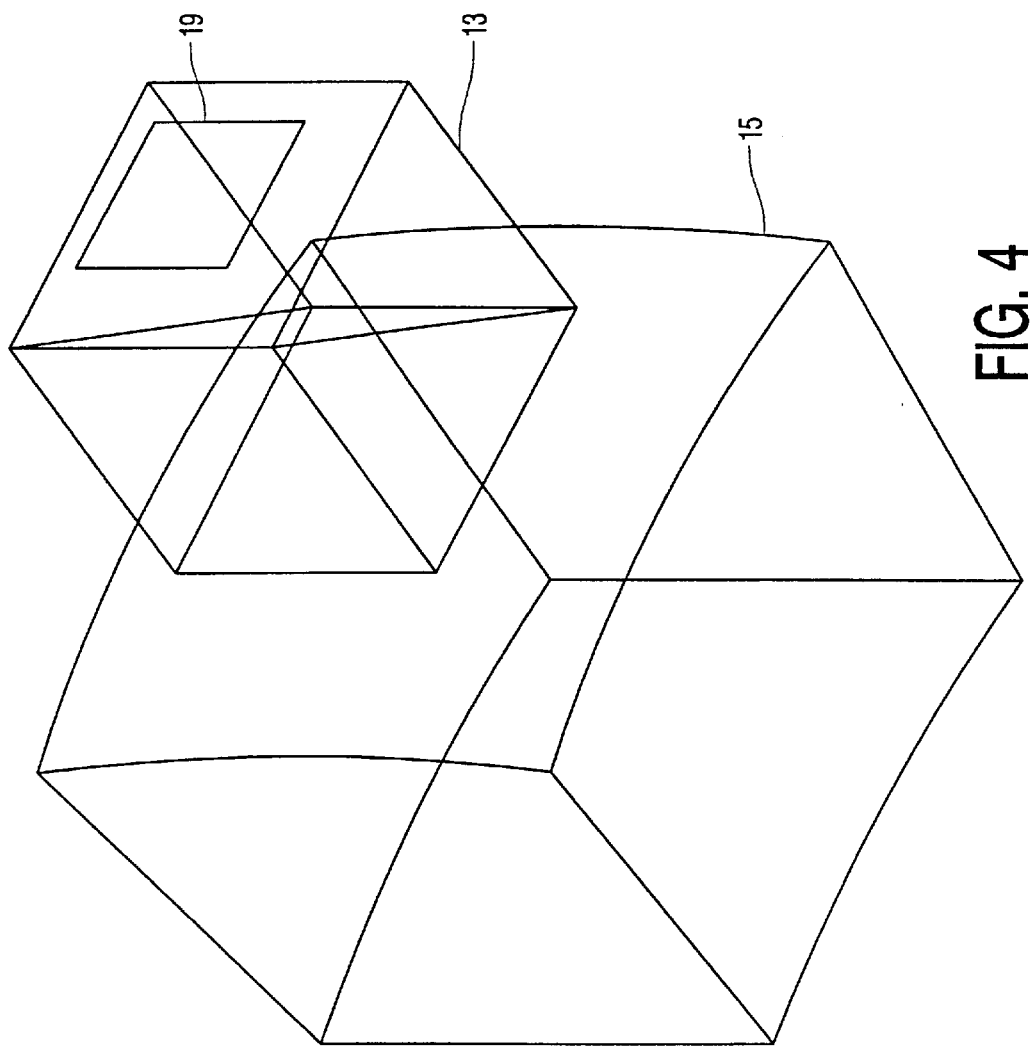
FIG. 4 shows an embodiment in a perspective view of one lens segment with one display element for use in an image display device according to the invention.

FIG. 4 is a perspective view of an embodiment of one lens segment 15 with a display element 19. A splitting cube 13 is present between the display element 19 and the lens segment 15. The lens segment 15 has a square shape. In the case of a larger curvature of the lens surface of the composite lens, with which a larger field of view can be realized, different shapes, for example, pentagonal or hexagonal shapes are possible for the separate lens segments. As the field of view realized with a lens segment becomes smaller, the total surface area of display elements also becomes smaller. This has the advantage that the total cost price will be decreased because it is proportional to the surface area of display elements. Moreover, it is then also sufficient to use smaller elements which couple the illumination beam into the system, which contributes to the compactness of the system.

In all mentioned embodiments comprising lens segments, the first and/or the second semitransparent reflecting surface of the separate lens segments may be aspherical. By making the surfaces aspherical, imaging errors such as curvature of the image field, astigmatism and coma can be prevented.

Alternatively, the lens segments may have spherical surfaces. Both surfaces may be spherical, or one of the surfaces of a lens segment may be spherical, whereas the other surface is aspherical. In the case where the lens segments have one or two spherical surfaces, the radius of curvature of one of the surfaces of the lens segments is preferably equal to the distance between the apex of the relevant spherical surface and the exit pupil of the image display device, and these spherical surfaces of the different lens segments have the same center of curvature. The same center of curvature can therefore be the case for only one of the surfaces if the lens segments have two spherical surfaces. In this way, the surface consisting of spherical partial surfaces forms one whole, so that its manufacture is simplified considerably.

Figure 5A:
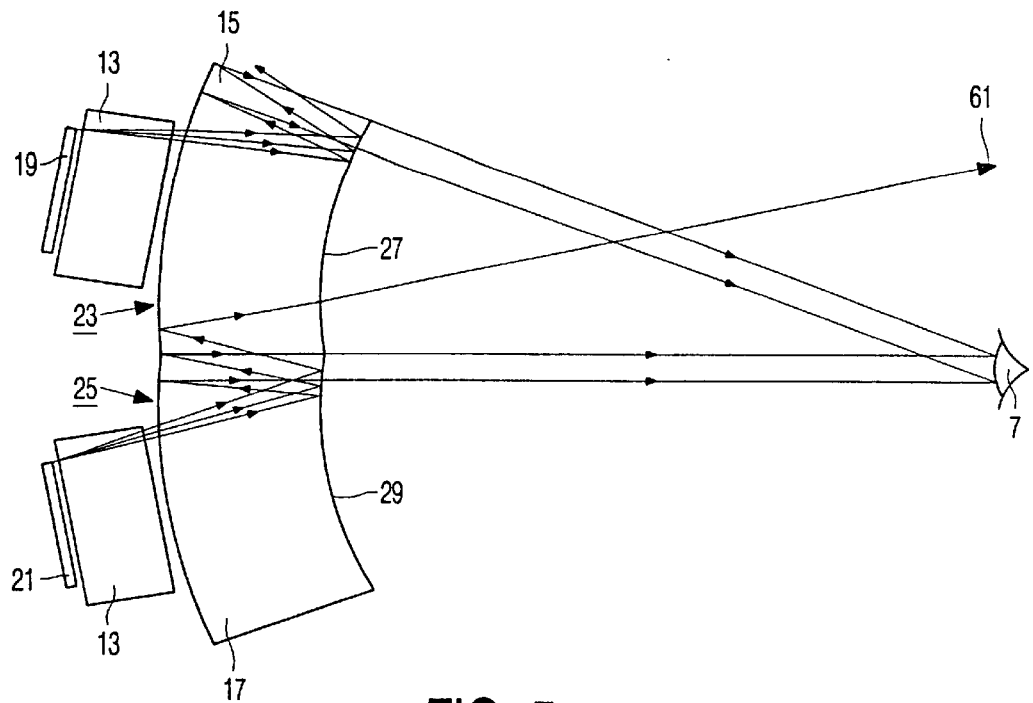
FIGS. 5(a) and 5(b) show the radiation paths in an image display device having two lens segments, before and after correction for radiation beams of border pixels.

FIG. 5(a) illustrates the radiation path in an image display device with two lens segments, as also shown in FIG. 2(a), but now particularly for a pixel at the edge of the display element. Corresponding elements are denoted by the same reference numerals. A radiation beam coming from a border pixel of the display element 21 will also be partly incident within the contiguous lens segment 15 where there will be reflection on the surface 23. Subsequently, the radiation beam will be guided towards the projected image. An example of a ray of such a radiation beam is illustrated by means of the arrow 61. Since this radiation beam does not contribute to the optical image but will give rise to disturbing light, the present invention proposes to optimize the optical image as follows.

A first possibility is to provide the surface between two contiguous lens segments with an absorbing layer.

Figure 5B:
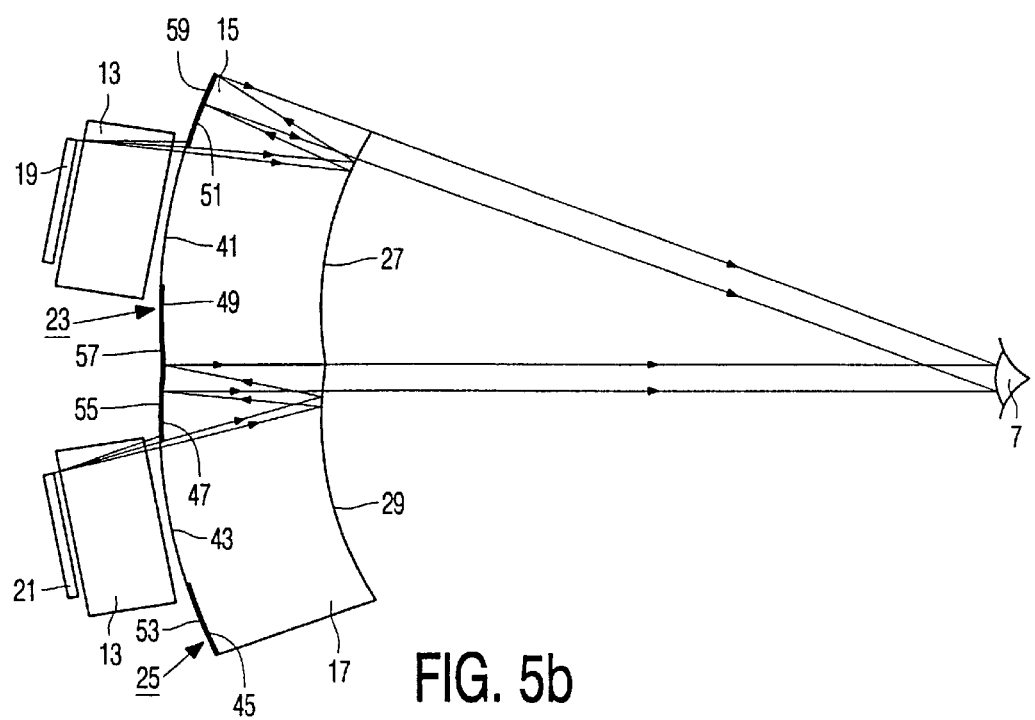

A second, simpler solution is shown in FIG. 5(b) and consists in dividing the surfaces 23, 25 of the lens segments 15, 17 into a central portion 41, 43 and lateral portions 45, 47; 49, 51 which enclose the central portions 41, 43. The central portions 41, 43 are provided with the above-mentioned semitransparent reflecting layer and the lateral portions 45, 47; 49, 51 are provided with an absorbing or a totally reflecting layer 53, 55; 57, 59. In this way, the radiation beams of border pixels entering a contiguous lens segment are suppressed so that the quantity of disturbing light is reduced considerably.

The lens segments in all of the embodiments hitherto described are formed from a single piece of optically transparent material having a refractive index of more than 1 and comprising both the first and the second semitransparent reflecting surface.

Figure 6:
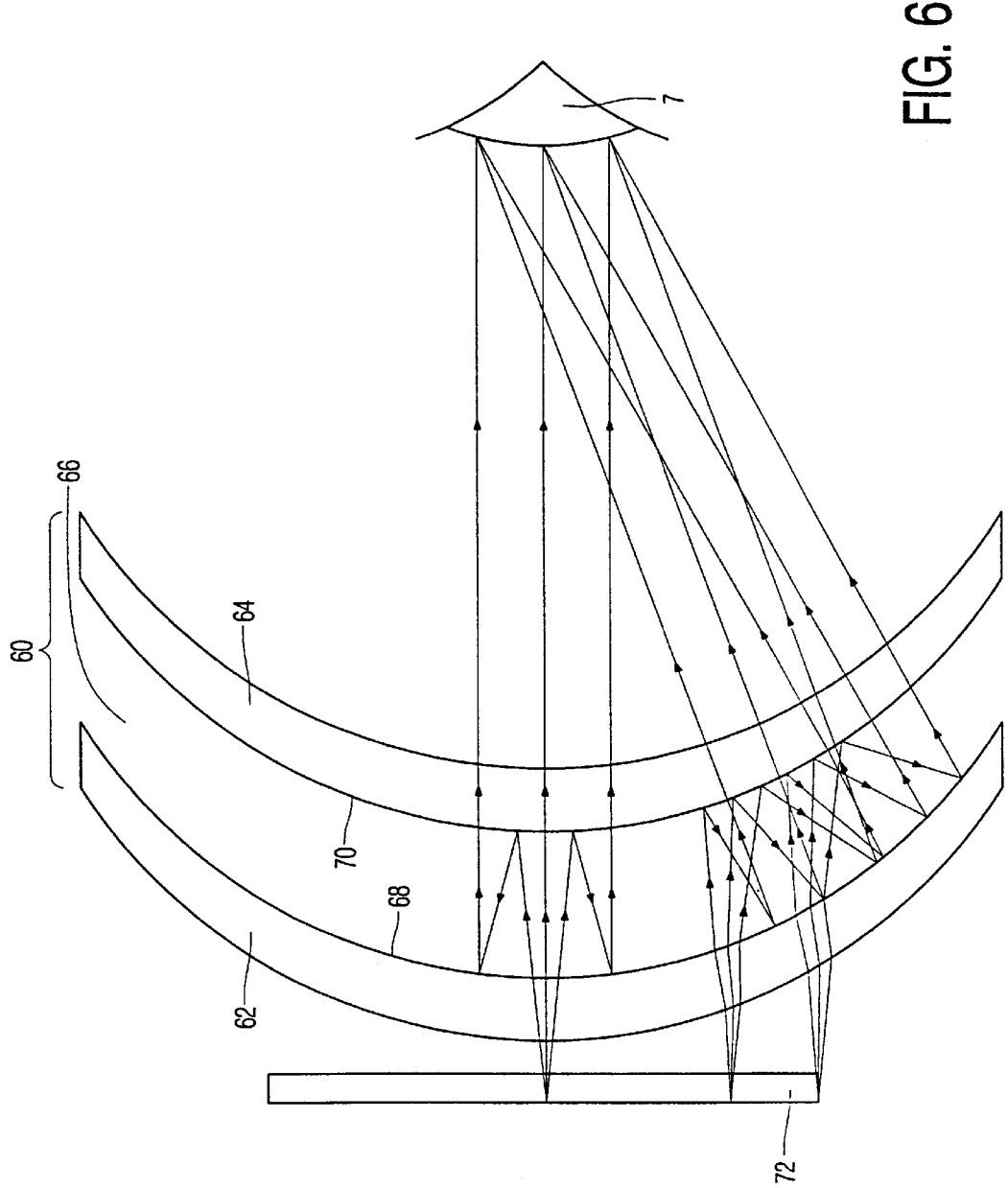
FIG. 6 shows an embodiment of a segment of a segmented lens system, in which the first and the second semitransparent reflecting surface enclose a layer of air.

FIG. 6 shows another embodiment of a segment 60 of a segmented lens system. The segment 60 consists of two separate parts 62 and 64 of an optically transparent material. The two parts 62, 64 enclose a layer of air 66. This Figure also shows the radiation path for three different pixels. The first semitransparent reflecting surface 68 is present on the concave side of the first part 62. The second semitransparent reflecting surface 70 is present on the convex side of the second part 64. Preferably, the convex side of the lens system is directed towards the display element 72.

Figure 7:
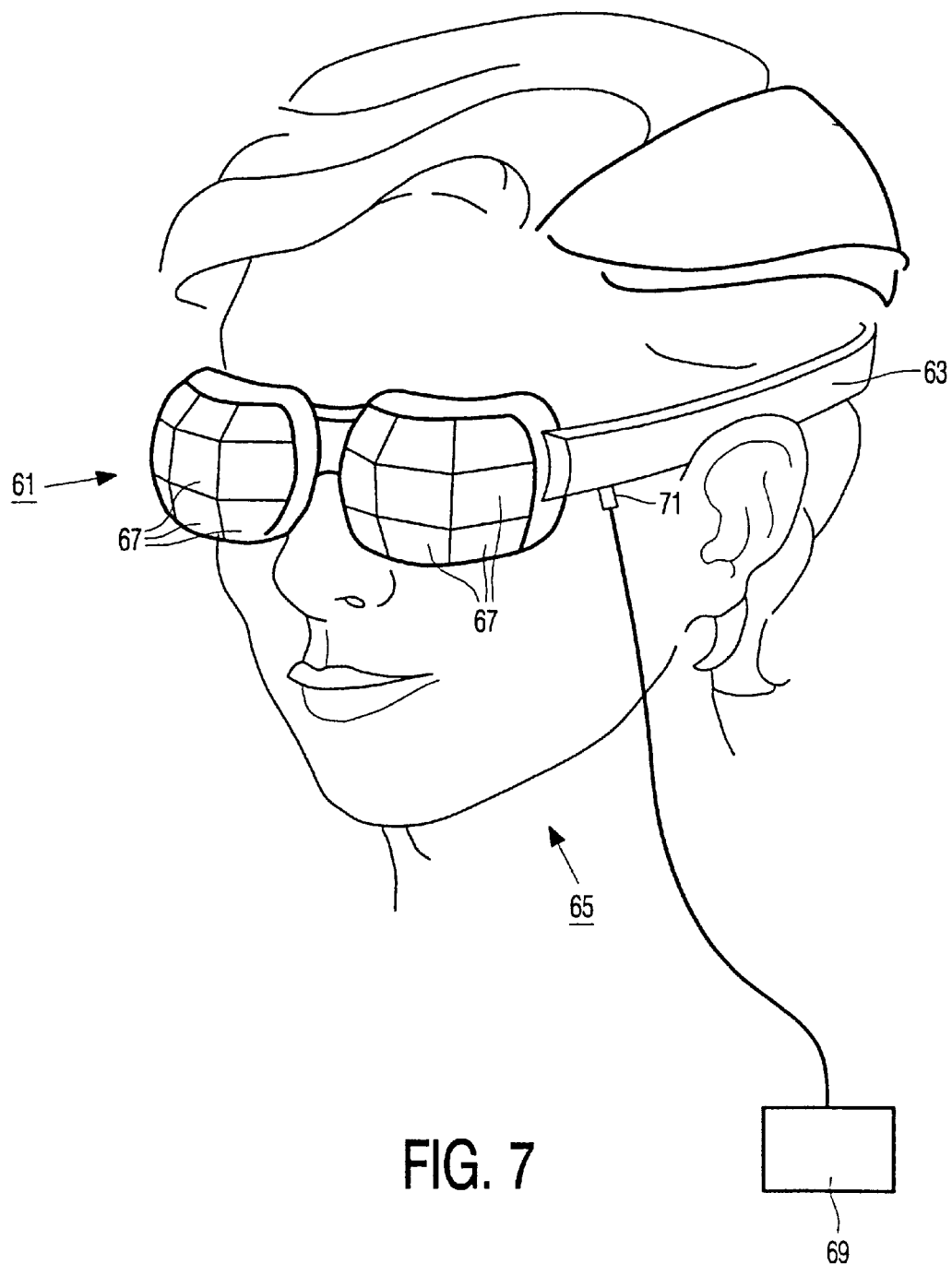
FIG. 7 shows diagrammatically a head-mounted display comprising an image display device according to the invention.

FIG. 7 shows an embodiment of a head-mounted display 61 comprising an image display device according to the invention. The head-mounted display comprises head-supporting means 63 for supporting the display on the viewer's head 65. Each "spectacle glass" is divided into segments 67. Each segment 67 comprises a display element, an element for coupling in an illumination beam and a lens segment, which combination has been extensively described hereinbefore. The image information is applied from, for example a receiver 69 to the head-mounted display via, for example a connection 71 provided for this purpose in the head-supporting means 63.

The image display device according to the invention may be alternatively, for example an image display device which, instead of being placed on the viewer's head, is placed on a table, in which case the viewer should move his head close to the image display device when using this device.

The present invention thus proposes an image display device in which an image of a two-dimensional display element is projected via an optical system in the pupil of the eye of a viewer. The optical system comprises a lens system which is segmented. The display element is subdivided into an equal number of segments. In this way, an image display device having a relatively large field of view can thus be realized in a relatively inexpensive way. A lens segment may consist of a single piece of optically transparent material or of two separate parts of optically transparent material enclosing a layer of air.

I claim:

1. An image display device comprising:
   at least one two-dimensional display element and
   an optical system comprising a lens system having a focal plane, wherein
   the display element is divided into a plurality of display element segments,
   the lens system is divided into a plurality of lens segments and includes suppression means to suppress radiation beams from traversing contiguous leg segments of the plurality of lens segments,
   each lens segment of the plurality of lens segments including:
      a first surface which is semitransparent and reflective and directed towards the display element, and
      a second surface which is semitransparent and reflective and remote from the display element, and
   each lens segment having a substantially common focal plane corresponding to the focal plane of the lens system.

2. An image display device as claimed in claim 1, wherein said suppression means comprises an absorbing layer situated at an interface between the contiguous lens segments.

3. An image display device comprising:

at least one two-dimensional display element and an optical system comprising a lens system having a focal plane, the display element is divided into a plurality of display element segments, and the lens system is divided into a plurality of lens segments, each lens segment of the plurality of lens segments including:

a first surface which is semitransparent and reflective and directed towards the display element, and a second surface which is semitransparent and reflective and remote from the display element, and wherein each lens segment has a substantially common focal plane corresponding to the focal plane of the lens system.

4. An image display device as claimed in claim 3, wherein the first surface is aspherical.

5. An image display device as claimed in claim 3, wherein the second surface is aspherical.

6. An image display device as claimed in claim 3, wherein the first surface and the second surface of each lens segment encloses an optically transparent material having a refractive index of more than 1.

7. An image display device as claimed in claim 3, wherein the first surface and the second surface of each lens segment encloses air.

8. An image display device as claimed in claim 3, wherein each lens segment has a polygonal shape.

9. An image display device as claimed in claim 3, wherein an absorbing layer is provided between contiguous lens segments of the plurality of lens segments.

10. An image display device as claimed in claim 3, wherein the first surface of each lens segment comprises a central portion which is enclosed between two lateral portions, the central portion comprising a semitransparent reflecting layer and the lateral portions comprising an absorbing layer.

11. An image display device as claimed in claim 3, wherein the first surface of each lens segment comprises a central portion which is enclosed between two lateral portions, the central portion comprising a semitransparent reflecting layer and the lateral portions comprising a totally reflecting layer.

12. An image display device as claimed in claim 3, wherein the first surface of each lens segment comprises a spherical segment having a radius of curvature that is substantially equal to a distance between an apex of the first surface and an exit pupil of the device, the spherical segment of each lens segment having substantially the same center of curvature.

13. An image display device as claimed in claim 3, wherein the second surface of each lens segment comprises a spherical segment having a radius of curvature, which is substantially equal to a distance between an apex of the second surface and an exit pupil of the device, the spherical segment of each lens segment having substantially the same center of curvature.

14. An image display device as claimed in claim 3, wherein each of the plurality of display element segments comprises a liquid crystalline display panel.

15. An image display device as claimed in claim 3, wherein the display element has a field of view determined by a total field angle $\Omega_1 \times \Omega_2$ divided into a plurality of segments $\omega_1 \times \omega_2$ wherein $\Omega_1/\omega_1$ and $\Omega_2/\omega_2$ are each 10°.

16. An image display device as claimed in claim 3, wherein each lens segment has a field angle of 10°×10°.

17. A head-mounted display comprising:

an image display device that projects an image to a viewer's eye, and a head-mounted support that supports the image display device, wherein the image display device includes:

at least one two-dimensional display element and an optical system comprising a lens system having a focal plane, the display element is divided into a plurality of display element segments, and the lens system is divided into a plurality of lens segments, each lens segment of the plurality of lens segments including:

a first surface which is semitransparent and reflective and directed towards the display element, and a second surface, which is semitransparent and reflective and remote from the display element, and wherein each lens segment has a substantially common focal plane corresponding to the focal plane of the lens system.

18. A head-mounted display as claimed in claim 17, wherein the first surface of each lens segment comprises a central portion which is enclosed between two lateral portions, the central portion comprising a semitransparent reflecting layer and the lateral portions comprising an absorbing layer.

19. A head-mounted display as claimed in claim 17, wherein the first surface of each lens segment comprises a central portion which is enclosed between two lateral portions, the central portion comprising a semitransparent reflecting layer and the lateral portions comprising a totally reflecting layer.

* * * * *